(12) United States Patent
Yang

(10) Patent No.: US 10,373,399 B2
(45) Date of Patent: Aug. 6, 2019

(54) PHOTOGRAPHING SYSTEM FOR LONG-DISTANCE RUNNING EVENT AND OPERATION METHOD THEREOF

(71) Applicant: Acer Incorporated, New Taipei (TW)

(72) Inventor: Tsung-Han Yang, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 15/607,243

(22) Filed: May 26, 2017

(65) Prior Publication Data

US 2018/0033215 A1 Feb. 1, 2018

(30) Foreign Application Priority Data

Jul. 27, 2016 (TW) .............................. 105123686 A

(51) Int. Cl.
| | | |
|---|---|---|
| *G07C 1/24* | (2006.01) |
| *G06K 7/10* | (2006.01) |
| *G06K 9/00* | (2006.01) |
| *H04N 5/232* | (2006.01) |
| *H04N 7/18* | (2006.01) |

(52) U.S. Cl.
CPC ........... *G07C 1/24* (2013.01); *G06K 7/10128* (2013.01); *G06K 7/10425* (2013.01); *G06K 7/10475* (2013.01); *G06K 9/00248* (2013.01); *H04N 5/23219* (2013.01); *H04N 7/188* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,094,615 | B2* | 7/2015 | Aman | .................... G01S 3/7864 |
| 9,485,404 | B2* | 11/2016 | Hansen | ................... G06Q 50/10 |
| 9,953,195 | B2* | 4/2018 | Turner | ............... G06K 7/10306 |
| 10,050,650 | B2* | 8/2018 | O'Hagan | ........... G06K 7/10227 |
| 2007/0279494 | A1* | 12/2007 | Aman | ................... G01S 3/7864 |
| | | | | 348/169 |
| 2013/0076913 | A1* | 3/2013 | Xu | ..................... H04N 5/23206 |
| | | | | 348/169 |

(Continued)

FOREIGN PATENT DOCUMENTS

| | | |
|---|---|---|
| CN | 102930611 | 2/2013 |
| TW | M388052 | 9/2010 |

(Continued)

*Primary Examiner* — Anand P Bhatnagar
(74) *Attorney, Agent, or Firm* — J.C. Patents

(57) ABSTRACT

A photographing system for a long-distance running event and an operation method thereof are provided. A radio frequency identification (RFID) reader is installed in a long-distance running path. The RFID reader can read RFID tags worn by runners to obtain time information of the runners passing a position of the RFID reader in the long-distance running path. A camera installed in the long-distance running path can photograph the runners to obtain photos. A processing device can receive the photos from the camera. The processing device can perform a face recognition operation on the photos to group the photos into at least one photo group. The processing device can establish mapping relationships between the at least one photo group and the runners based on the time information provided by the RFID reader.

14 Claims, 3 Drawing Sheets

(56) References Cited

U.S. PATENT DOCUMENTS

| | | | | |
|---|---|---|---|---|
| 2014/0337434 A1* | 11/2014 | Hansen | ............ | G06Q 50/10 709/204 |
| 2014/0354808 A1* | 12/2014 | Hansen | ............ | G06Q 50/10 348/143 |
| 2014/0361906 A1* | 12/2014 | Hughes | ............ | H04Q 9/00 340/870.01 |
| 2015/0294141 A1* | 10/2015 | Molyneux | ............ | A43B 1/0054 700/91 |
| 2015/0317801 A1* | 11/2015 | Bentley | ............ | H04N 7/181 382/107 |
| 2016/0292881 A1* | 10/2016 | Bose | ............ | G06K 9/00342 |

FOREIGN PATENT DOCUMENTS

| | | |
|---|---|---|
| TW | M452412 | 5/2013 |
| TW | M482119 | 7/2014 |
| TW | I464010 | 12/2014 |

* cited by examiner

US 10,373,399 B2

PHOTOGRAPHING SYSTEM FOR LONG-DISTANCE RUNNING EVENT AND OPERATION METHOD THEREOF

CROSS-REFERENCE TO RELATED APPLICATION

This application claims the priority benefit of Taiwan application serial no. 105123686, filed on Jul. 27, 2016. The entirety of the above-mentioned patent application is hereby incorporated by reference herein and made a part of this specification.

BACKGROUND OF THE INVENTION

Field of the Invention

The invention relates to a photographing system, and in particular, a photographing system for a long-distance running event and an operation method thereof.

Description of Related Art

Runners participating in long-distance running events (e.g., a marathon) do not generally bring along photographing equipment when they run. Therefore, runners participating in long-distance running events have relatively few chances to take photos for memory. In the market, there are groups that assist in photography. Such groups take photos of the runners in a long-distance running event. In one to a few days after the long-distance running event, they select photos of specific runners among the photos of a large number of runners by manual recognition and provide the selected photos to the specific runners as photos for memory of the event. However, if the runners can receive photos in real time when they run, imaginably, such real-time photos can touch the runners and/or the runners can share such photos with their friends in real time.

SUMMARY OF THE INVENTION

The invention provides a photographing system and an operation method thereof for establishing a mapping relationship between a photo and a runner in real time.

One embodiment of the invention provides a photographing system. The photographing system includes a first radio frequency identification (RFID) reader, a processing device, and at least one camera. The first RFID reader is installed in a long-distance running path. The first RFID reader is configured to read a RFID tag worn by at least one runner to obtain time information of the at least one runner passing a position of the first RFID reader in the long-distance running path. The at least one camera is installed in the long-distance running path. The at least one camera is configured to photograph the at least one runner to obtain at least one photo. The processing device is configured to receive the at least one photo from the at least one camera. The processing device is configured to perform a face recognition operation on the at least one photo to group the at least one photo into at least one photo group. The processing device is configured to establish a mapping relationship between the at least one photo group and the at least one runner based on the time information provided by the first RFID reader.

One embodiment of the invention provides an operation method of a photographing system. The operation method includes: reading a RFID tag worn by at least one runner through a first RFID reader to obtain time information of the at least one runner passing a position of the first RFID reader in a long-distance running path; photographing the at least one runner through at least one camera installed in the long-distance running path to obtain at least one photo; performing a face recognition operation on the at least one photo through a processing device to group the at least one photo into at least one photo group; and establishing a mapping relationship between the at least one photo group and the at least one runner through the processing device based on the time information provided by the first RFID reader.

In light of the above, the photographing system and the operation method thereof provided in the embodiments of the invention can photograph different runners in the long-distance running path to obtain a plurality of photos. The photographing system can perform a face recognition operation on the photos to group the photos into a plurality of photo groups. In addition, the photographing system can read RFID tags worn by the runners to obtain time information of the runners passing specific positions. Based on the time information, the photographing system can establish mapping relationships between the photos and the runners in real time.

To provide a further understanding of the aforementioned and other features and advantages of the invention, exemplary embodiments, together with the reference drawings, are described in detail below.

DESCRIPTION OF THE EMBODIMENTS

Throughout the text of the specification (including the claims), the term "couple (or connect)" refers to any direct or indirect connection means. For example, where a first device is described to be coupled (or connected) to a second device in the text, it should be interpreted that the first device may be directly connected to the second device, or that the first device may be indirectly connected to the second device through another device or some connection means. Moreover, wherever applicable, elements/components/steps referenced by the same numerals in the figures and embodiments refer to the same or similar parts. Elements/components/steps referenced by the same numerals or the same language in different embodiments may be mutually referred to for relevant descriptions.

Figure 1:
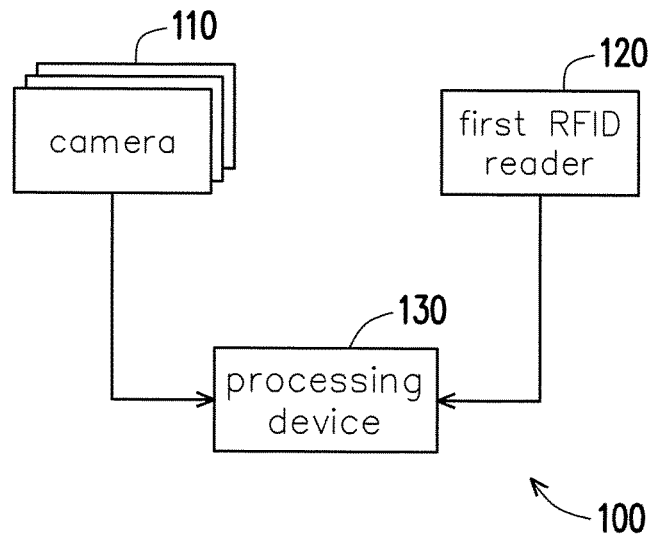
FIG. 1 is a circuit block diagram illustrating a circuit of a photographing system according to one embodiment of the invention.

FIG. 1 is a circuit block diagram illustrating a circuit of a photographing system 100 according to one embodiment of the invention. The photographing system 100 includes a first radio frequency identification (RFID) reader 120, a processing device 130, and one (or more than one) camera 110. The camera 110 is installed in a long-distance running path of a long-distance running event. The camera 110 photographs one (or more than one) runner to obtain one (or more than one) photo. The first RFID reader 120 is installed in the long-distance running path of the long-distance running event. The first RFID reader 120 reads a RFID tag worn by one (or more than one) runner to obtain time information of the runner passing a specific position (a position of the first RFID reader 120 in the long-distance running path). The present embodiment does not limit the implementation and algorithm for sensing/reading the RFID tag. For example, the first RFID reader 120 may sense/read the RFID tag by adopting the conventional art, and the conventional operation of reading the RFID tag shall not be repeated here.

The processing device 130 receives photos from the camera 110. The processing device 130 performs a face recognition operation on the photos to group the photos into one (or more than one) photo group. For example, the processing device 130 may group photos including a face A among the photos into a photo group A and group photos including a face B among the photos into a photo group B. The present embodiment does not limit the implementation and algorithm for the face recognition operation. For example, the processing device 130 may perform the face recognition operation by adopting the conventional art, and the conventional face recognition operation shall not be repeated here.

Figure 2:
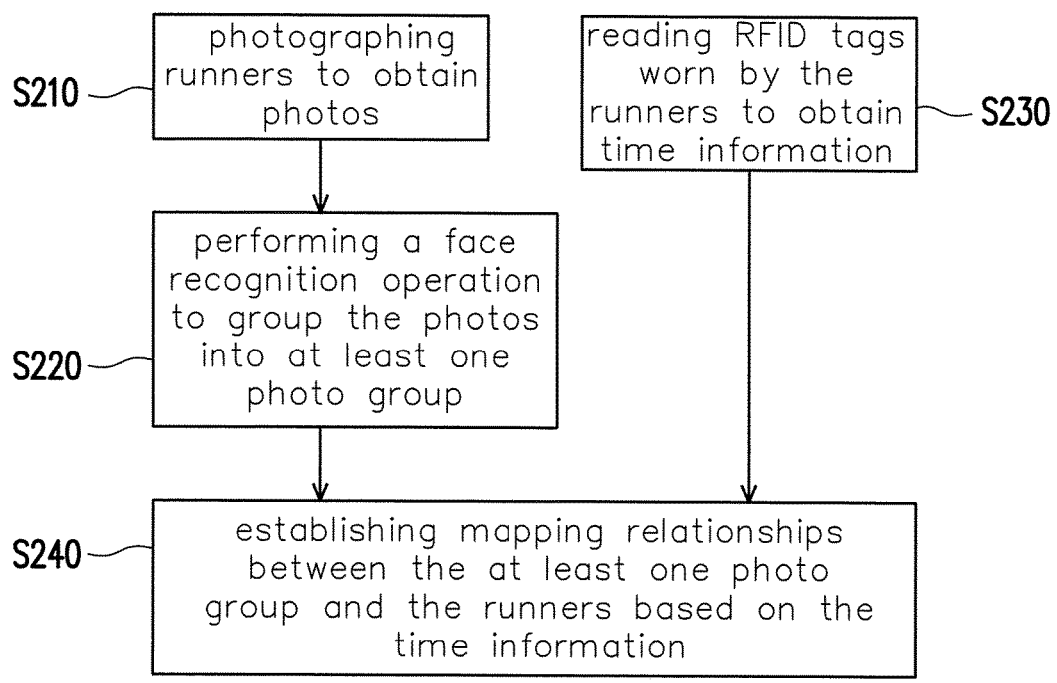
FIG. 2 is a flowchart illustrating an operation method of a photographing system according to one embodiment of the invention.

FIG. 2 is a flowchart illustrating an operation method of a photographing system according to one embodiment of the invention. Referring to FIG. 1 and FIG. 2, in step S210, the camera 110 photographs one (or more than one) runner to obtain one (or more than one) photo. The photos are transmitted to the processing device 130. The processing device 130 receives the photos from the camera 110. In step S220, the processing device 130 performs a face recognition operation on the photos to group the photos into one (or more than one) photo group. In step S230, the first RFID reader 120 reads a RFID tag worn by one (or more than one) runner to obtain time information of the runners passing a specific position (a position of the first RFID reader 120 in the long-distance running path). In step S240, based on the time information provided by the first RFID reader 120, the processing device 130 establishes mapping relationships between the photo groups and the runners.

In some embodiments, based on the mapping relationships obtained in step S240, the processing device 130 actively transmits at least one corresponding photo among the photo groups to a mobile communication device (e.g., a mobile phone or a smart watch) of a corresponding runner among the runners. For example, regarding each runner (referred to as the corresponding runner here) among the runners, based on the mapping relationships obtained in step S240, the processing device 130 is aware that photos of one photo group (referred to as a corresponding photo group here) among the photo groups include the corresponding runner, and the processing device 130 may accordingly actively transmit one or more (or all) photos of the corresponding photo group to a smart watch (or a mobile phone) of the corresponding runner. As a result, the corresponding runner can receive his/her own photos in real time in the long-distance running event.

In other embodiments, based on the mapping relationships obtained in step S240, the processing device 130 provides network link information of a corresponding photo group among the photo groups to a mobile communication device (e.g., a mobile phone or a smart watch) of a corresponding runner among the runners. For example, regarding each runner (referred to as the corresponding runner here), based on the mapping relationships obtained in step S240, the processing device 130 is aware that photos of one photo group (referred to as the corresponding photo group here) among the photo groups include the corresponding runner and the processing device 130 may accordingly actively transmit the network link information (e.g., a web address) of the corresponding photo group to a smart watch (or a mobile phone) of the corresponding runner. As a result, the corresponding runner can operate the smart watch (or mobile phone) in the long-distance running event to link to the webpage/website corresponding to the network link information and view his/her own photos in real time.

Figure 3:
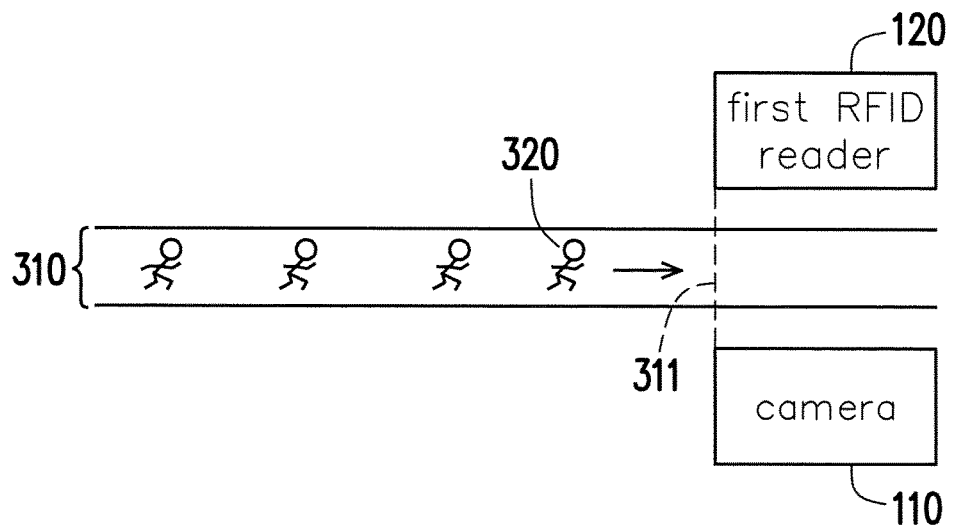
FIG. 3 is a schematic diagram illustrating a situation where the photographing system shown in FIG. 1 is applied in a long-distance running event.

FIG. 3 is a schematic diagram illustrating a situation where the photographing system 100 shown in FIG. 1 is applied in a long-distance running event. The camera 110 and the first RFID reader 120 are installed in a long-distance running path 310 of a long-distance running event. In the applied situation illustrated in FIG. 3, the camera 110 is installed in proximity to the first RFID reader 120. A plurality of runners are in the long-distance running path 310. When a runner 320 passes a position 311 of the first RFID reader 120 in the long-distance running path 310, the first RFID reader 120 reads a RFID tag worn by the runner 320 to obtain time information of the runner 320 passing the position 311. The camera 110 photographs the runner 320 to obtain a photo (hereinafter referred to as a photo to be verified). The processing device 130 compares the time information provided by the first RFID reader 120 (the time when the runner 320 passes the position 311) with the time information provided by the camera 110 (the time when the photo to be verified is taken). When a time difference between "the time when the runner 320 passes the position 311" and "the time when the photo to be verified is taken" is less than a predetermined tolerance range, the processing device 130 automatically establishes a mapping relationship between the photo to be verified and the runner 320.

In some situations, a plurality of photos of the same runner may be grouped into two or more photo groups. For example, supposing that a photo group A was marked as a photo group of the runner 320 at an earlier time point, but a mapping relationship has not been established between a photo group B and any runner (actually, the photo group B is also a photo of the same runner 320). When the camera 110 takes a photo to be verified of the runner 320 passing the position 311, the processing device 130 groups the photo to be verified into the photo group B based on a result of a face recognition operation. Once the processing device 130 establishes a mapping relationship between the photo to be verified and the runner 320 based on the time information provided by the first RFID reader 120, the processing device 130 can automatically mark the photo group B as the photo group of the runner 320. Since the photo group A and the photo group B are both marked as the photo groups of the same runner 320, the processing device 130 can merge the photo group A and the photo group B into one single photo group.

In other situations, mapping relationships may not have been established between a plurality of photo groups and any runners. The processing device 130 defines a time range based on a photographing time of any one photo group (hereinafter referred to as a target photo group) among the photo groups. Based on the time range, the processing device 130 selects one or more than one candidate runner among the runners, wherein a time when the candidate runner passes the position 311 of the first RFID reader 120 in the long-distance running path 310 falls in the time range. When only one candidate runner passes the position 311 at a time that falls in the time range, the processing device 130 automatically establishes a mapping relationship between the target photo group and the candidate runner. When a plurality of candidate runners pass the position 311 at times that fall in the time range, the processing device 130 may have different handling approaches, as respectively described in different embodiments below.

In some embodiments, the processing device 130 provides a user operation interface for an operator to establish mapping relationships between the photo groups and the candidate runners. The processing device 130 provides the operator with one or more candidate runners among all runners of whom the time of passing the position 311 falls in the time range. The operator views face photos of the target photo group through the user operation interface and selects one corresponding runner among the candidate runners to establish a mapping relationship between the target photo group and the corresponding runner.

In other embodiments, before the position 311, another camera (not illustrated; reference may be made to the camera 110 for analogical description) and another RFID reader (not illustrated; reference may be made to the first RFID reader 120 for analogical description) are installed at another position (not illustrated; referred to as a previous position here) in the long-distance running path 310. Referring to relevant descriptions of FIG. 3 for analogy, when a runner 320 passes the previous position, the processing device 130 obtains a photo of the runner 320 at the previous position and establishes a mapping relationship between the photo at the previous position and the runner 320. At the position 311, mapping relationships may not have been established between a plurality of photo groups and any runners. Based on the mapping relationship between the photo at the previous position and the runner 320, the processing device 130 can compare the photo at the previous position with the photo groups to automatically select one target photo group among the plurality of photo groups at the position 311 and further establish a mapping relationship between the target photo group and the runner 320.

In still other embodiments, from event sign-up data files, the processing device 130 obtains face photos (referred to as sign-up data photos here) of the candidate runners passing the position 311 in the time range. The processing device 130 compares the sign-up data photos of the candidate runners with the target photo group to automatically select one corresponding runner among the candidate runners and further establish a mapping relationship between the target photo group and the corresponding runner. Accordingly, the processing device 130 can establish mapping relationships between the photo groups and the runners.

Figure 4:
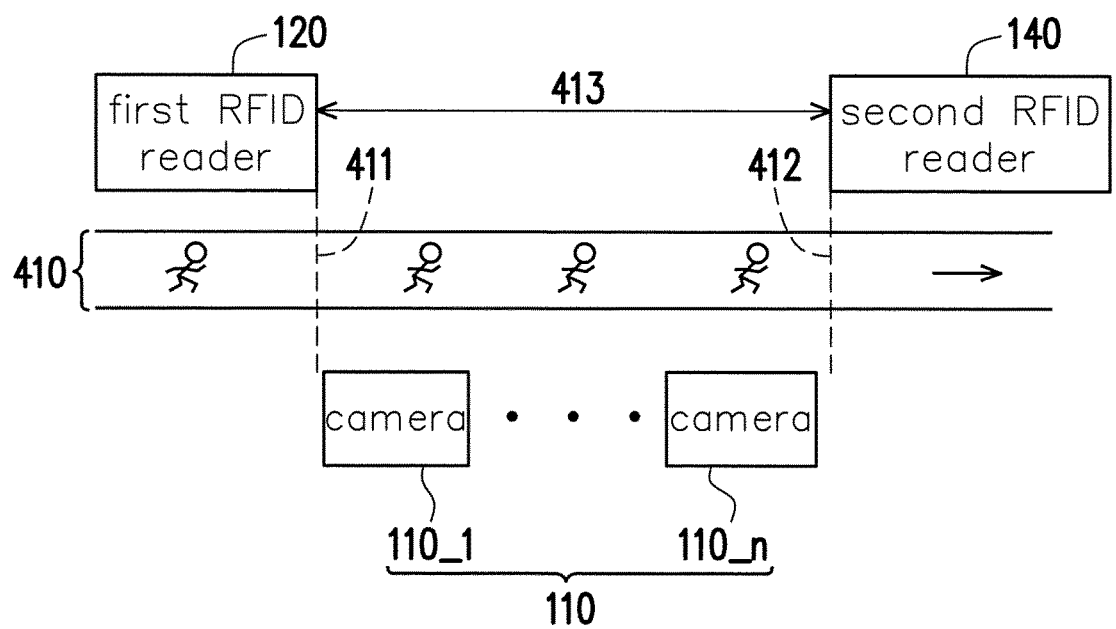
FIG. 4 is a schematic diagram illustrating another situation where the photographing system shown in FIG. 1 is applied in a long-distance running event.

FIG. 4 is a schematic diagram illustrating another situation where the photographing system 100 shown in FIG. 1 is applied in a long-distance running event. In the embodiment illustrated in FIG. 4, the photographing system 100 further includes a second RFID reader 140, and the camera 110 includes a plurality of cameras (such as cameras 110_1 and 110_n illustrated in FIG. 4). The cameras 110_1 to 110_n, the first RFID reader 120, and the second RFID reader 140 are installed in a long-distance running path 410 of a long-distance running event. The first RFID reader 120 and the second RFID reader 140 are respectively installed at different positions in the long-distance running path 410 (e.g., a position 411 and a position 412 illustrated in FIG. 4). The first RFID reader 120 reads a RFID tag worn by a runner in the long-distance running path 410 to obtain time information of the runner passing the position 411 of the first RFID reader 120 in the long-distance running path 410. The second RFID reader 140 reads a RFID tag worn by the runner in the long-distance running path 410 to obtain time information of the runner passing the position 412 of the second RFID reader 140 in the long-distance running path 410.

The long-distance running path 410 between the first RFID reader 120 and the second RFID reader 140 is a path section 413 (i.e., the long-distance running path 410 between the position 411 and the position 412). The cameras 110_1 to 110_n are installed at different positions in the path section 413. The cameras 110_1 to 110_n photograph one or more runners at different positions to obtain one or more photos.

The processing device 130 performs a face recognition operation on the photos provided by the cameras 110_1 to 110_n to group the photos into one or more photo groups. The processing device 130 defines a time range based on a photographing time of photos of any one photo group (referred to as a target photo group here) among the photo groups. Based on time information provided by the first RFID reader 120 and the second RFID reader 140, the processing device 130 is aware that positions of some runners (referred to as non-candidate runners here) among the runners are not in the path section 413 in the time range. Accordingly, the processing device 130 can screen out the non-candidate runners among the runners to obtain candidate runners.

In some embodiments, an operator views face photos of the target photo group and selects one corresponding runner among the candidate runners to establish a mapping relationship between the target photo group and the corresponding runner. In other embodiments, the processing device 130 obtains face photos (referred to as sign-up data photos here) of the candidate runners from event sign-up data files. The processing device 130 compares the sign-up data photos of the candidate runners with the target photo group to automatically select one corresponding runner among the candidate runners and further establish a mapping relationship between the target photo group and the corresponding runner. Accordingly, the processing device 130 can establish mapping relationships between the photo groups and the runners.

Figure 5:
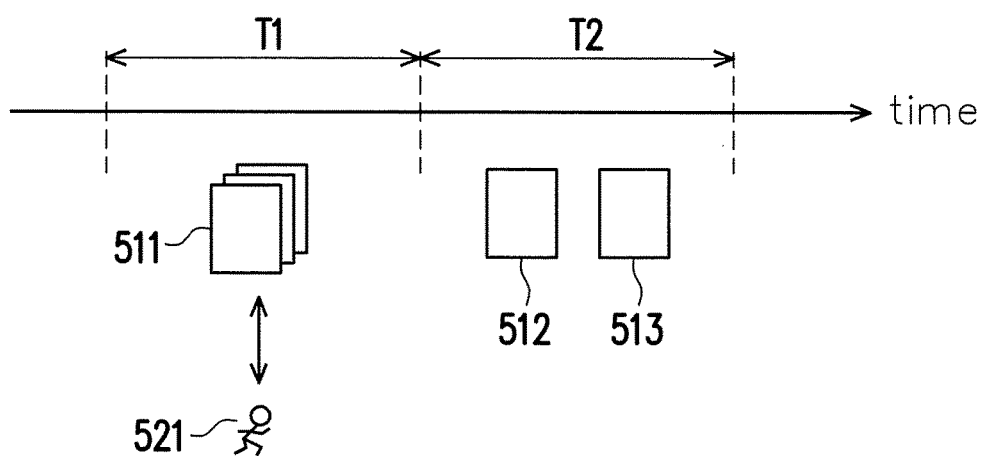
FIG. 5 is a schematic diagram illustrating a temporal order of photographing by the photographing system shown in FIG. 1.

FIG. 5 is a schematic diagram illustrating a temporal order of photographing by the photographing system 100 shown in FIG. 1. A horizontal axis illustrated in FIG. 5 represents time of a long-distance running event. Based on the description in the foregoing embodiments, supposing here that the photographing system 100 has completed grouping of a plurality of photos taken in a time segment T1 and completed establishing mapping relationships between the photo groups in the time segment T1 and the runners. For example, in FIG. 5, the photographing system 100 has marked a photo group 511 taken in the time segment T1 as photos of a runner 521. After the time segment T1 is over, a time segment T2 follows. A plurality of runners (including the runner 521) passes the RFID reader and the camera at a next position. The camera at the next position takes a plurality of photos in the time segment T2. Based on time information of the runner 521 passing the next position, the processing device 130 selects from the plurality of photos taken in the time segment T2. For example, through a face recognition operation, the processing device 130 selects candidate photos 512 and 513 from the plurality of photos taken in the time segment T2, wherein faces of runners in the candidate photos 512 and 513 are determined to be similar to faces of runners in the photo group 511. Moreover, a photographing time of the candidate photos 512 and 513 are in line with the time information of the runner 521 passing the next position. The photographing system 100 displays the photo of the runner 521 already marked in the time segment T1 for the operator's review (or automatically performs an analysis of face similarity) for comparison with the candidate photos 512 and 513 in the time segment T2. Based on features (e.g., faces, colors of clothes, etc.) of the runners in the candidate photos, the operator (or automatically performed by the processing device 130) verifies that the candidate photo 512 is a photo of the runner 521, and the candidate photo 513 is not a photo of the runner 521. Accordingly, the processing device 130 can delete the candidate photo 513 and add the candidate photo 512 into the photo group 511.

It shall be noted that in different applied situations, the relevant functions of the processing device 130 may be implemented as software, firmware, or hardware by utilizing common programming languages (e.g., C or C++), hardware description languages (e.g., Verilog HDL or VHDL), or other adequate programming languages. The software (or the firmware) capable of executing the relevant functions can be arranged into any known computer-accessible media such as magnetic tapes, semiconductor memories, magnetic disks, or compact disks (e.g., CD-ROM or DVD-ROM); or the software (or the firmware) may be transmitted via the Internet, a wired communication, a wireless communication, or other communication media. The software (or the firmware) may be stored in the computer-accessible media, so that a computer processor can access/execute programming codes of the software (or the firmware). In addition, the device and the method of the invention can also be implemented by a combination of hardware and software.

In summary of the above, the photographing system 100 and the operation method thereof provided in the embodiments of the invention can photograph different runners in the long-distance running path to obtain a plurality of photos. The photographing system 100 can perform a face recognition operation on the photos to group the photos into a plurality of photo groups. In addition, the photographing system 100 can read RFID tags worn by the runners to obtain time information of the runner passing specific positions. Based on the time information, the photographing system 100 can establish mapping relationships between the photos and the runners in real time. In some embodiments, the processing device 130 actively transmits a corresponding photo (or network link information of the corresponding photo) of one runner to a mobile communication device of the one runner. Accordingly, the one runner can view his/her own photo in real time.

Although the invention is disclosed as the embodiments above, the embodiments are not meant to limit the invention. Any person skilled in the art may make slight modifications and variations without departing from the spirit and scope of the invention. Therefore, the protection scope of the invention shall be defined by the claims attached below.

What is claimed is:

1. A photographing system comprising:
    a first radio frequency identification reader installed in a long-distance running path for reading a radio frequency identification tag worn by at least one runner to obtain time information of the at least one runner passing a position of the first radio frequency identification reader in the long-distance running path;
    at least one camera installed in the long-distance running path for photographing the at least one runner to obtain at least one photo; and
    a processing device for receiving the at least one photo from the at least one camera, grouping the at least one photo into at least one photo group according to a face recognition operation, determining whether a time difference between the time information and the time obtaining the at least one photos is less than a predetermine range, determining a number of the radio frequency identification tag read by the first radio frequency identification reader, and establishing a mapping relationship between the at least one photo group and the at least one runner in response to that the time difference is less than the predetermine range and the number of the radio frequency identification tag read by the first radio frequency identification reader is 1.

2. The photographing system according to claim 1, wherein the processing device actively transmits at least one corresponding photo among the at least one photo group to a mobile communication device of a corresponding runner among the at least one runner based on the mapping relationship between the at least one photo group and the at least one runner.

3. The photographing system according to claim 1, wherein the processing device provides network link information of a corresponding photo group among the at least one photo group to a mobile communication device of a corresponding runner among the at least one runner based on the mapping relationship between the at least one photo group and the at least one runner.

4. The photographing system according to claim 1, wherein the processing device defines a time range based on a photographing time of a target photo group among the at least one photo group and selects a corresponding runner among the at least one runner to establish a mapping relationship between the target photo group and the corresponding runner, wherein a time when the corresponding runner passes the position of the first radio frequency identification reader in the long-distance running path falls in the time range.

5. The photographing system according to claim 1, further comprising:
    a second radio frequency identification reader installed in the long-distance running path for reading the radio frequency identification tag worn by the at least one runner to obtain time information of the at least one runner passing a position of the second radio frequency identification reader in the long-distance running path, wherein the first radio frequency identification reader and the second radio frequency identification reader are respectively installed at different positions in the long-distance running path, the long-distance running path between the first radio frequency identification reader and the second radio frequency identification reader is a path section, and the at least one camera is installed in the path section.

6. The photographing system according to claim 5, wherein the processing device defines a time range based on a photographing time of a target photo group among the at least one photo group, and screens out a non-candidate runner among the at least one runner based on the time information provided by the first radio frequency identification reader and the second radio frequency identification reader, wherein in the time range, a position of the non-candidate runner is not in the path section.

7. The photographing system according to claim 1, wherein the processing device further reads a runner information in response to that the number of the radio frequency identification tag read by the first radio frequency identification reader is more than 1, obtaining a runner photo corresponding to the at least one photo group according to the runner information, establishing a mapping relationship between the at least one photo group and the at least one runner according to a runner information.

8. The photographing system according to claim 1, wherein the processing device further receives a plurality of photos from the at least one camera, grouping the plurality of photos into a plurality of photo groups according to a face recognition operation, determining whether a time difference between the time information and the time obtaining the at least one photos is less than a predetermine range, and establishing a mapping relationship between the plurality of photo groups and the at least one runner, incorporates the plurality of photo groups corresponding to the same runner into single photo groups.

9. An operation method of a photographing system, comprising:
reading a radio frequency identification tag worn by at least one runner through a first radio frequency identification reader to obtain time information of the at least one runner passing a position of the first radio frequency identification reader in a long-distance running path;
photographing the at least one runner through at least one camera installed in the long-distance running path to obtain at least one photo;
grouping the at least one photo into at least one photo group according to a face recognition operation, determining whether a time difference between the time information and the time obtaining the at least one photos is less than a predetermine range, determining a number of the radio frequency identification tag read by the first radio frequency identification reader; and
establishing a mapping relationship between the at least one photo group and the at least one runner through the processing device in response to that the time difference is less than the predetermine range and the number of the radio frequency identification tag read by the first radio frequency identification reader is 1.

10. The operation method of a photographing system according to claim 9, further comprising:
actively transmitting at least one corresponding photo among the at least one photo group to a mobile communication device of a corresponding runner among the at least one runner through the processing device based on the mapping relationship between the at least one photo group and the at least one runner.

11. The operation method of a photographing system according to claim 9, further comprising:
providing network link information of a corresponding photo group among the at least one photo group to a mobile communication device of a corresponding runner among the at least one runner through the processing device based on the mapping relationship between the at least one photo group and the at least one runner.

12. The operation method of a photographing system according to claim 9, wherein the step of establishing the mapping relationship between the at least one photo group and the at least one runner comprises:
defining a time range through the processing device based on a photographing time of a target photo group among the at least one photo group; and
selecting a corresponding runner among the at least one runner through the processing device to establish a mapping relationship between the target photo group and the corresponding runner, wherein a time when the corresponding runner passes the position of the first radio frequency identification reader in the long-distance running path falls in the time range.

13. The operation method of a photographing system according to claim 9, further comprising:
reading the radio frequency identification tag worn by the at least one runner through a second radio frequency identification reader installed in the long-distance running path to obtain time information of the at least one runner passing a position of the second radio frequency identification reader in the long-distance running path,
wherein the first radio frequency identification reader and the second radio frequency identification reader are respectively installed at different positions in the long-distance running path, the long-distance running path between the first radio frequency identification reader and the second radio frequency identification reader is a path section, and the at least one camera is installed in the path section.

14. The operation method of a photographing system according to claim 13, wherein the step of establishing the mapping relationship between the at least one photo group and the at least one runner comprises:
defining a time range through the processing device based on a photographing time of a target photo group among the at least one photo group; and
screening out a non-candidate runner among the at least one runner through the processing device based on the time information provided by the first radio frequency identification reader and the second radio frequency identification reader, wherein in the time range, a position of the non-candidate runner is not in the path section.

* * * * *